(12) United States Patent
Schröder

(10) Patent No.: US 8,576,687 B1
(45) Date of Patent: Nov. 5, 2013

(54) COMPACT TANGENTIAL TRACKING TONEARM MECHANISM

(71) Applicant: Frank Schröder, Berlin (DE)

(72) Inventor: Frank Schröder, Berlin (DE)

( * ) Notice: Subject to any disclaimer, the term of this patent is extended or adjusted under 35 U.S.C. 154(b) by 0 days.

(21) Appl. No.: 13/645,812

(22) Filed: Oct. 5, 2012

Related U.S. Application Data

(60) Provisional application No. 61/543,956, filed on Oct. 6, 2011, provisional application No. 61/549,502, filed on Oct. 20, 2011.

(51) Int. Cl.
*G11B 3/10* (2006.01)

(52) U.S. Cl.
USPC ............................ 369/222; 369/255

(58) Field of Classification Search
USPC ............... 369/220, 244.1, 245, 255, 222
See application file for complete search history.

(56) References Cited

U.S. PATENT DOCUMENTS

| | | | |
|---|---|---|---|
| 3,476,394 A | 11/1969 | Birch | |
| 3,813,100 A | 5/1974 | Meyer | |
| 3,826,505 A | 7/1974 | Birch | |
| 4,153,256 A | 5/1979 | Guha | |
| 4,205,854 A * | 6/1980 | Davis et al. | 369/255 |
| 4,344,168 A | 8/1982 | Enston | |
| 4,346,466 A | 8/1982 | Kanchev | |
| 4,570,253 A * | 2/1986 | Firebaugh | 369/255 |
| 4,580,258 A | 4/1986 | Dinsdale | |
| 4,587,646 A * | 5/1986 | Graham | 369/248 |
| 7,086,071 B2 * | 8/2006 | Schroder | 720/683 |
| 7,382,713 B2 * | 6/2008 | Graham | 369/252 |
| 7,630,288 B2 * | 12/2009 | Riggle | 369/245 |
| 2011/0176859 A1 * | 7/2011 | Chu | 403/91 |

FOREIGN PATENT DOCUMENTS

JP 57037761 A * 3/1982

* cited by examiner

*Primary Examiner* — Brian Miller
(74) *Attorney, Agent, or Firm* — Cohen & Grigsby, P.C.

(57) ABSTRACT

The invention relates to tonearm tracking mechanisms in phonograph players and mechanical devices constructed for the purpose of reproducing or playing back recorded audio material previously impressed, in the form or grooves, onto a surface of a disk, which are commonly called phonograph players or turntables. Such disk is commonly called, among other similar words, a phonograph record or a vinyl disk. The present invention is a tangential tracking tonearm mechanism, wherein the tonearm bearing subassembly has two rotary bearings in the lateral plane and a coupling linkage built into a compact subassembly. The collective contribution of these elements, when properly configured and appropriately adjusted, make, during playback of audio material on a disk, reduced playback distortion over radial tracking mechanisms and closely mimics the conditions under which nearly all masters are made.

14 Claims, 6 Drawing Sheets

COMPACT TANGENTIAL TRACKING TONEARM MECHANISM

BACKGROUND OF THE INVENTION

The present invention relates to tonearm tracking mechanisms in phonograph players. More particularly, the present invention relates to mechanical devices constructed for the purpose of reproducing or playing back recorded audio material previously impressed, in the form or grooves, onto a surface of a disk. Such devices are commonly called phonograph players or turntables. Such disk is commonly called, among other similar words, a phonograph record or a vinyl disk. Even more particularly, the present invention describes a novel design of the tonearm mechanism, a component part of a phonograph player which is capable of tracking a groove in a phonographic disk in a controlled fashion, most especially in a tangential manner.

Conventional tonearm mechanisms fall generally into two categories: 1) a radial tracking mechanism wherein the path of a stylus, which is attached via several subcomponents to the end of one end of a tonearm, follows a curved path over the surface of a grooved disk. The curved path is a portion of a circle centered about a point near and outside the outer circumference of the disk; and 2) a tangential tracking mechanism wherein the path of a stylus, which is attached via several subcomponents to the end of a tonearm, follows a linear path over the surface of a grooved disk. The linear path over the surface corresponds to a radial line from the center of the disk and the mechanism that is employed to achieve the linear path is a form of linear bearing.

Known in the art is a third category of tonearm mechanism, namely one that has a tracking characteristic that achieves the groove-to-stylus relationship of a tangential tracking mechanism but is constructed from rotational bearings similar to those found in a radial tracking mechanism. In this third category of tonearm mechanisms, the stylus need not follow a single radial line coming from the center of the phonograph disk. Tangential tracking mechanisms are considered to be capable of more accurately rendering the recorded material on a disk because the motion of a playback stylus relative to a groove of a disk more accurately mimics the manner in which the original audio material was cut into a surface of a master disk. Tangential tracking mechanisms are not as common as radial tracking mechanisms because tangential tracking mechanisms tend to be more complicated, physically larger, and more costly to produce than radial tracking mechanisms. The present invention falls into this third category of tonearm mechanisms. U.S. Pat. Nos. 3,476,394; 3,813,100; 3,826,505; 4,153,256; 4,344,168; 4,346,466; and 4,580,258 disclose various tonearms of this category.

SUMMARY OF THE INVENTION

Lathes used to cut masters of analog audio material on lacquer disks have (commonly) a cutting head that moves slowly in a radial direction, thus assuring that a groove created by a cutting diamond stylus is always oriented perpendicular to a radius of the disk. Positive (grooves, versus molded inverse "hills") copies or such masters may be played back using a phonograph player with a playback transducer having a stylus, a cartridge with internal components that hold the stylus, a headshell that supports the cartridge, the headshell attached to a tonearm which in turn is held by a tonearm bearing subassembly. When, during playback, the manner of playback closely matches the manner in which the original or master disk was produced, particularly with regard to the relative angular orientation of the stylus and the groove, one key source of systematic reproduction errors is essentially eliminated.

The various components of the tonearm mechanism must work together to allow a faithful rendering of audio material recorded on a disk. To achieve this result, the tonearm bearing subassembly must apply a force on the stylus to hold the stylus in the groove during tracking (i.e. while the disk is rotating about its axis) without applying so much force that the stylus wears surfaces of the groove; and the headshell, cartridge and stylus must rise and fall during tracking to accommodate changes in the vertical height of the top surface of the disk (e.g. due to a warped condition of the disk); and the tonearm bearing assembly should not allow the tonearm to rock about its own axis significantly; and the tonearm bearing assembly must allow the tonearm to track the groove in the disk as successive revolutions of the disk change the position of the stylus relative to the center of the disk.

The tracking properties of a tonearm assembly govern the fidelity of a signal created by a playback transducer. A tangential tracking tonearm allows the cartridge to play back the audio material in a way that very closely approximates the way in which the original master was created, and leads to superior sound fidelity compared to an otherwise similar, radial tracking tonearm (in the reproduced). A radial tracking tonearm plays back the audio material in a way that loosely approximates the way in which the original master was created, and leads to reduced sound fidelity. Terms commonly used to describe signal errors due to inaccurate rendering of the recorded material because the tracking during playback does not closely match the conditions under which the original master was created are "playback distortion" and "tracking distortion."

The present invention is a tangential tracking tonearm mechanism, wherein the tonearm bearing subassembly has two rotary bearings in the lateral plane and a coupling linkage built into a compact subassembly. The collective contribution of these elements, when properly configured and appropriately adjusted, make, during playback of audio material on a disk, reduced playback distortion over radial tracking mechanisms and closely mimics the conditions under which nearly all masters are made.

It is an object of the present invention to reduce tracking distortion by orienting the playback stylus in the disk's groove during playback in a manner designed to closely mimic the motion of the cutting stylus used during creation of the master.

It is an object of the present invention to maintain tangency of the stylus in the groove during playback.

It is an object of the present invention to provide a tonearm mechanism that may be attached, or retrofitted, to an existing turntable.

It is an object of the present invention to incorporate bearing technology that reduces frictional losses in order to minimize wear on the walls of the groove being played back and to assist in maintaining accurate tangency in the orientation or the stylus with respect to the groove throughout playback.

It is an object of the present invention to incorporate magnet technology to reduce the degree of error from tangency in tracking.

It is also an object of the present invention to incorporate specially shaped magnetic components in the path of a linkage magnetic field for setting the tracking characteristics of a stylus in a tonearm mechanism.

It is an object of the present invention to incorporate, into a tonearm mechanism, linkage mechanisms comprising non-magnet and non-magnetic components and two vertically-oriented rotary bearings to control the angular and translational disposition of a stylus during playback to achieve substantially tangential tracking.

It is an object of the present invention to provide a linkage means for tailoring the path a stylus follows, both in angular orientation and in displacement, during playback.

Further objects and advantages will be described in succeeding sections of this specification.

DESCRIPTION OF PREFERRED EMBODIMENT

Figure 1:
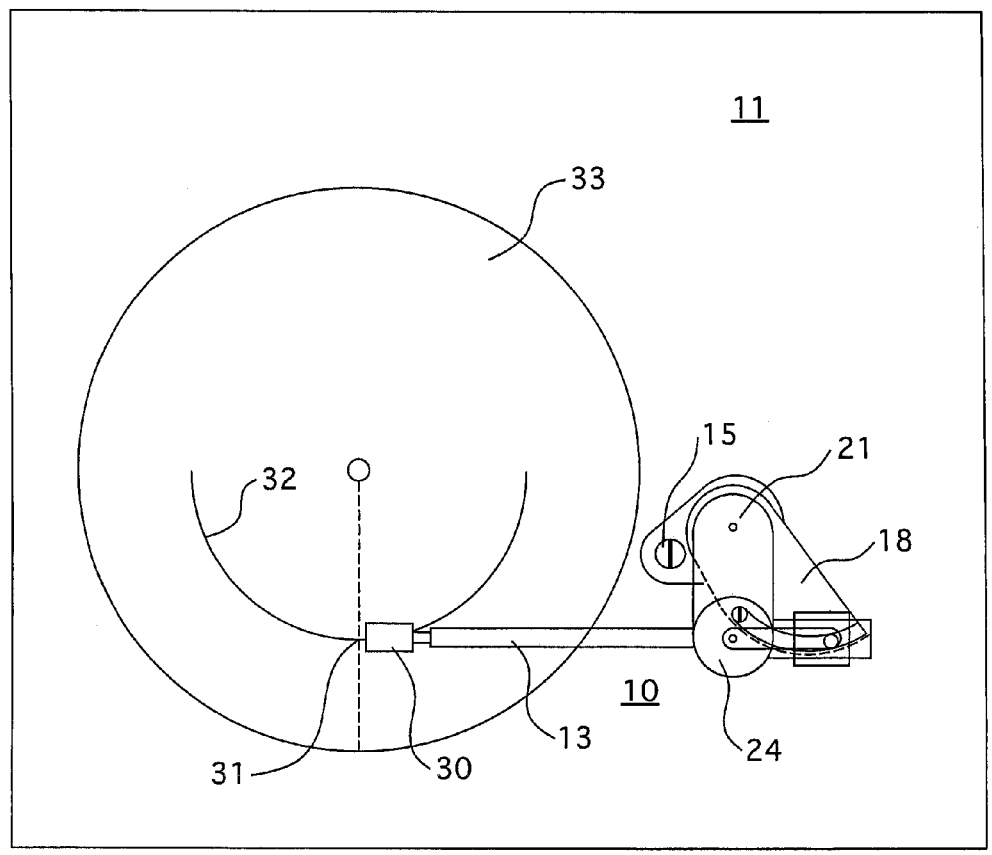
FIG. 1 is a top view of a phonograph player and shows where the tonearm subassembly resides relative to other components of a phonograph player.
Figure 2:
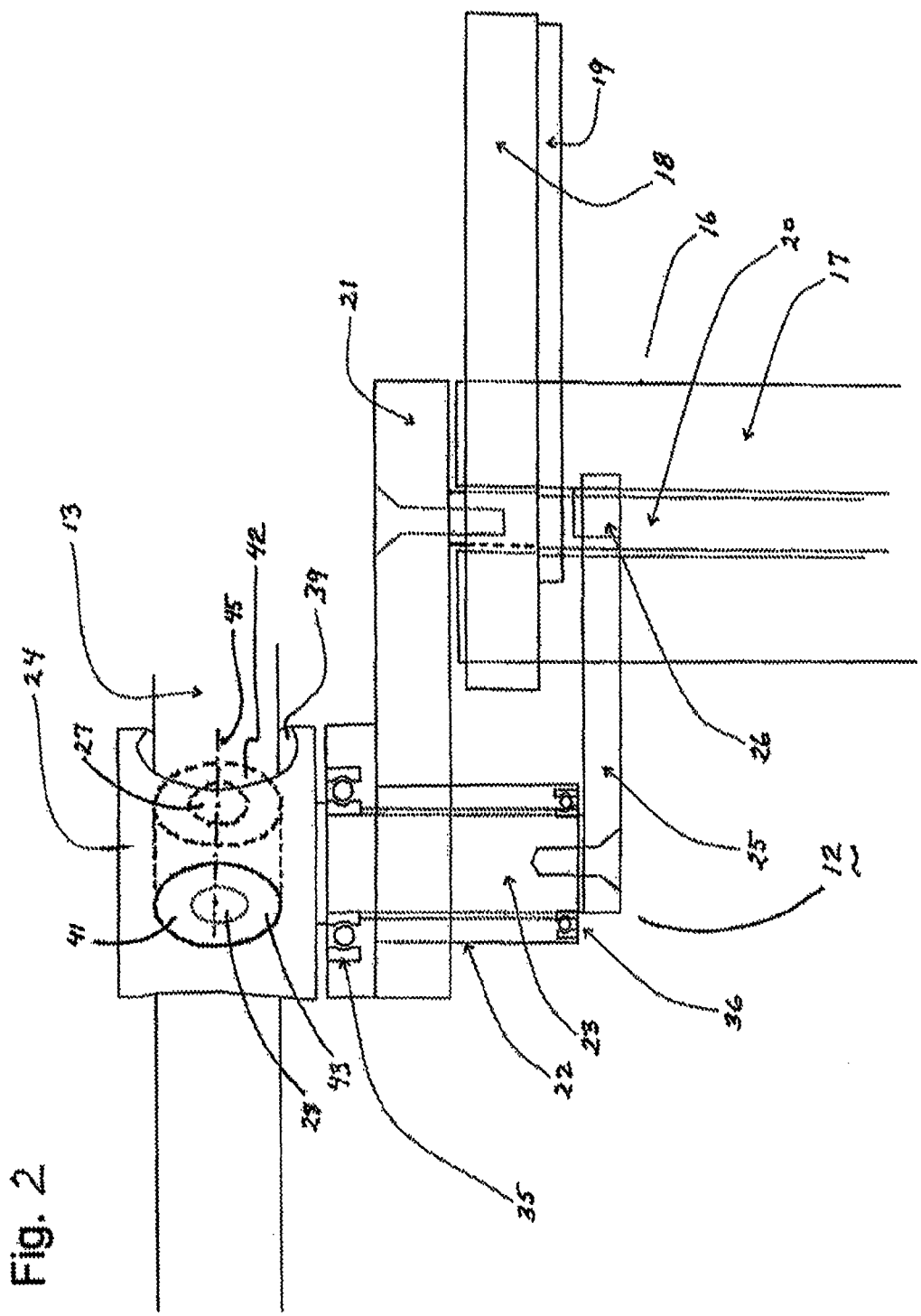
FIG. 2 is a schematic diagram, side view, of the bearings and linkage of the tonearm mechanism, where the magnet is at an inner end of the magnet guide.
Figure 3:
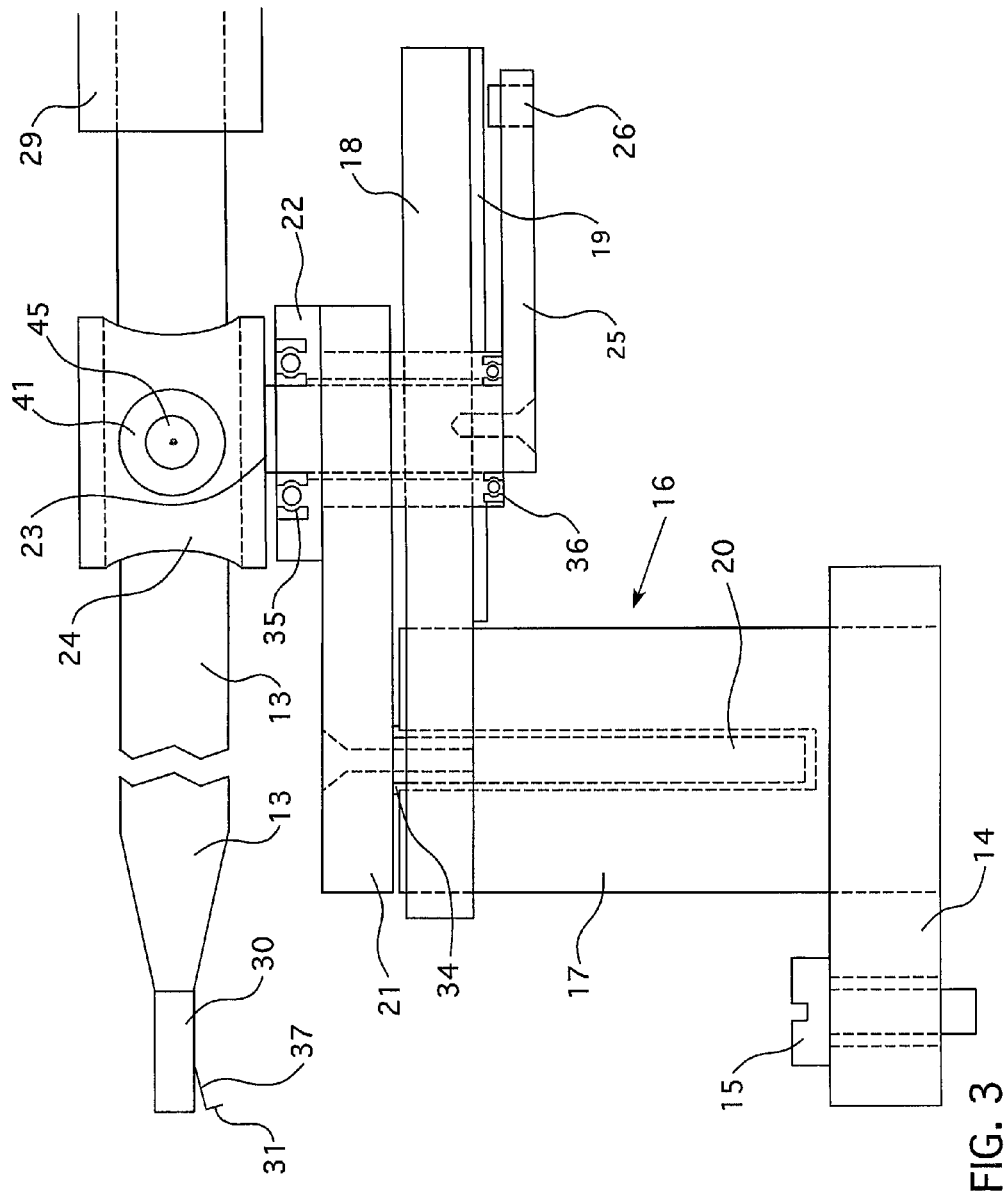
FIG. 3 is a schematic diagram, side view, of the bearings and linkage of the tonearm mechanism, where the magnet is at an outer end of the magnet guide.
Figure 4:
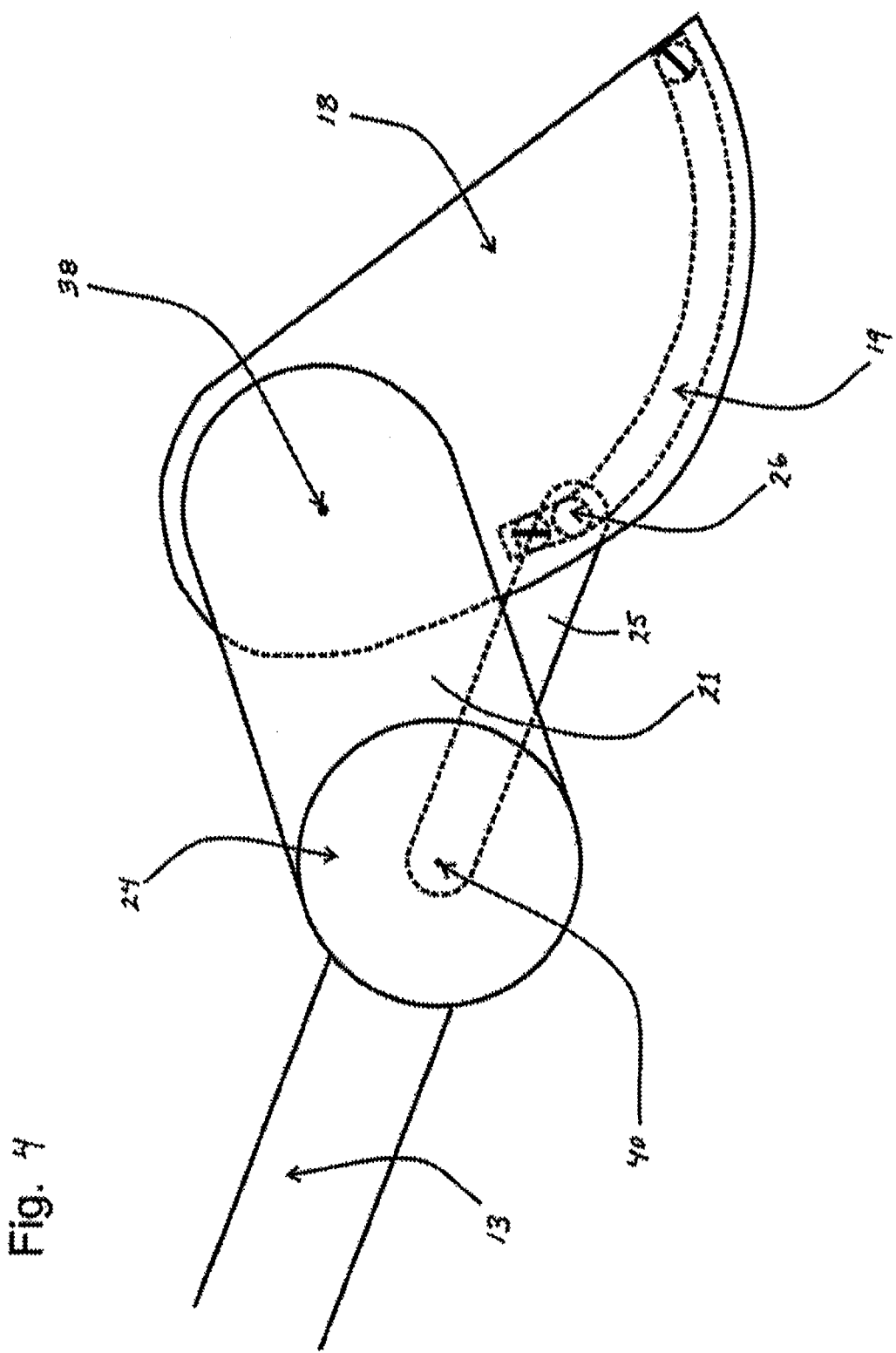
FIG. 4 is a schematic diagram, top view, of a portion of the tonearm mechanism showing the disposition of the vertical bearings when the magnet is at an inner end of the magnet guide.
Figure 5:
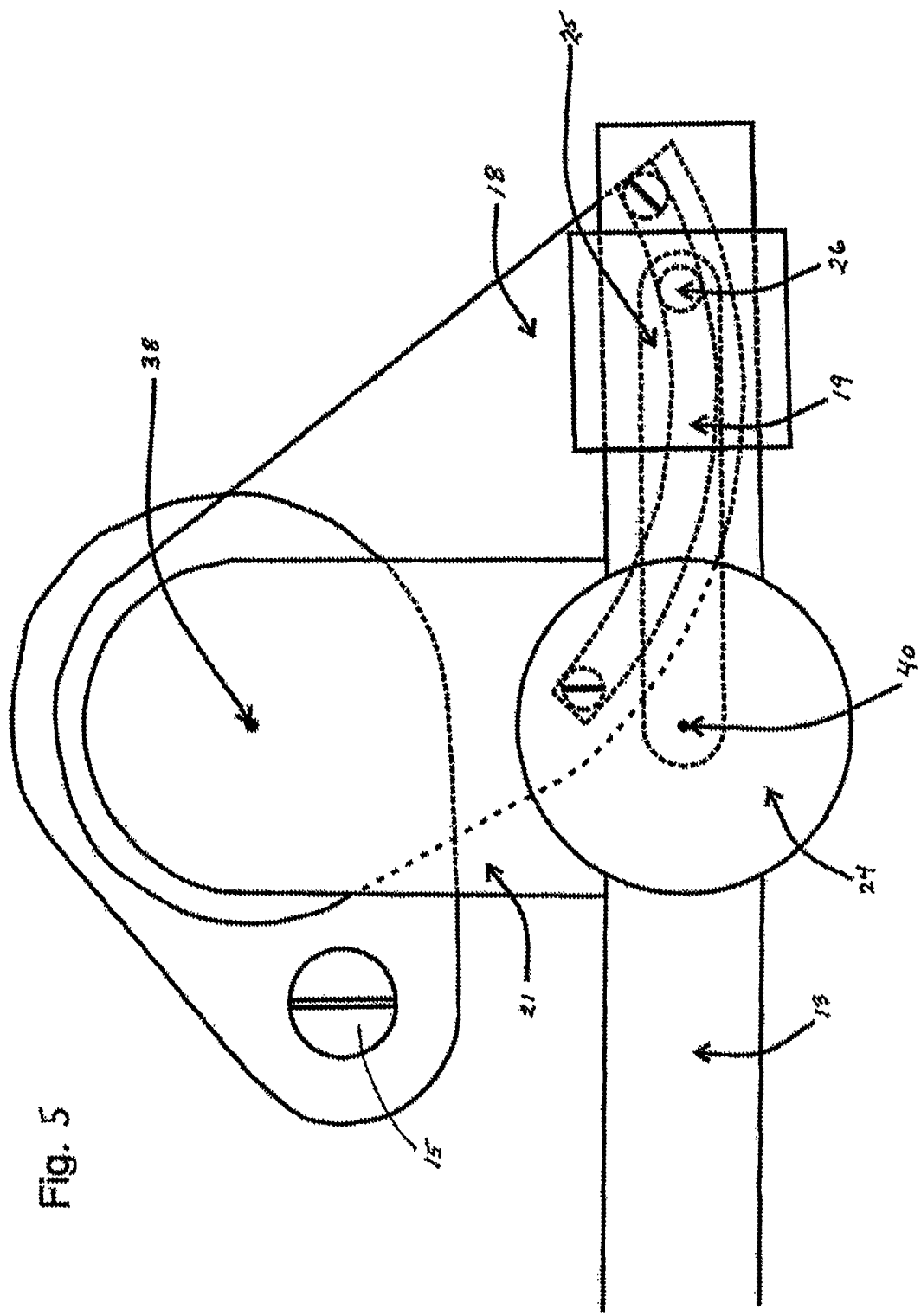
FIG. 5 is a schematic diagram, top view, of a portion of the tonearm mechanism showing the disposition of the vertical bearings when the magnet is near the outer end of the magnet guide.

Referring now to the drawings, the invention is shown in FIGS. 1 through 6 as a set of components of a tonearm mechanism 10 assembled atop a planar surface of a phonograph turntable. In FIG. 1, attached above turntable surface 11 is tonearm bearing subassembly 12, which in turn supports tonearm 13. A component of tonearm bearing subassembly 12, shown in FIG. 3, is tonearm mounting collar 14 which is affixed, via base screw 15 to turntable surface 11. Supported by tonearm mounting collar 14 is a vertically-oriented base bearing subassembly 16. Referring to FIG. 3, attached or incorporated within base bearing subassembly 16 are vertical bearing housing 17, base bearing 34, guide platform 18 and magnet guide 19, and base shaft 20.

Referring again to FIG. 3, attached to the top of base shaft 20 is swivel platform 21. Inserted in a hole in swivel platform 21 and rigidly affixed is vertically-oriented tonearm bearing-housing 22, containing upper swivel bearing 35 and lower swivel bearing 36, into which is placed tonearm shaft 23. The top of tonearm shaft 23 supports tonearm pivot housing 24. To the bottom of tonearm shaft 23 is attached magnet platform 25 upon which is affixed magnet 26.

Referring now to FIG. 2 and FIG. 3, within tonearm pivot housing 24 are two point pivot bearings, left point pivot bearing 27 and right point pivot bearing 28 which, together, support tonearm 13. Left point pivot bearing 27 and right point pivot bearing 28 together define a horizontally-oriented bearing and serve to restrict, within tonearm pivot housing 24, tonearm 13 to rotation about tonearm pivot axis 45. To the rear of tonearm 13 is attached counterweight 29. The counterweight 29 features an inner sleeve, made from a marginally compliant material, such as an acetal resin, Delrin (a registered trademark of, and manufactured and sold by E. I. DuPont De Nemours and Company) or a fluorinated hydrocarbon polymer such as Teflon (a registered trademark of, and manufactured and sold by E. I. DuPont De Nemours and Company). A grub screw, accessible from above, compresses the sleeve such that the effective coupling intensity can be adjusted by varying the screw torque. In other words, the counterweight can be slid—against varying friction—to adjust the tracking force unless the grub screw is tightened sufficiently to secure the position. To the front of tonearm 13 is attached headshell 30. Contained within or held below headshell 30 is a cartridge, not shown, containing components, not shown, leading to a cantilever 37 to which a playback stylus 31 is attached.

Figure 6:
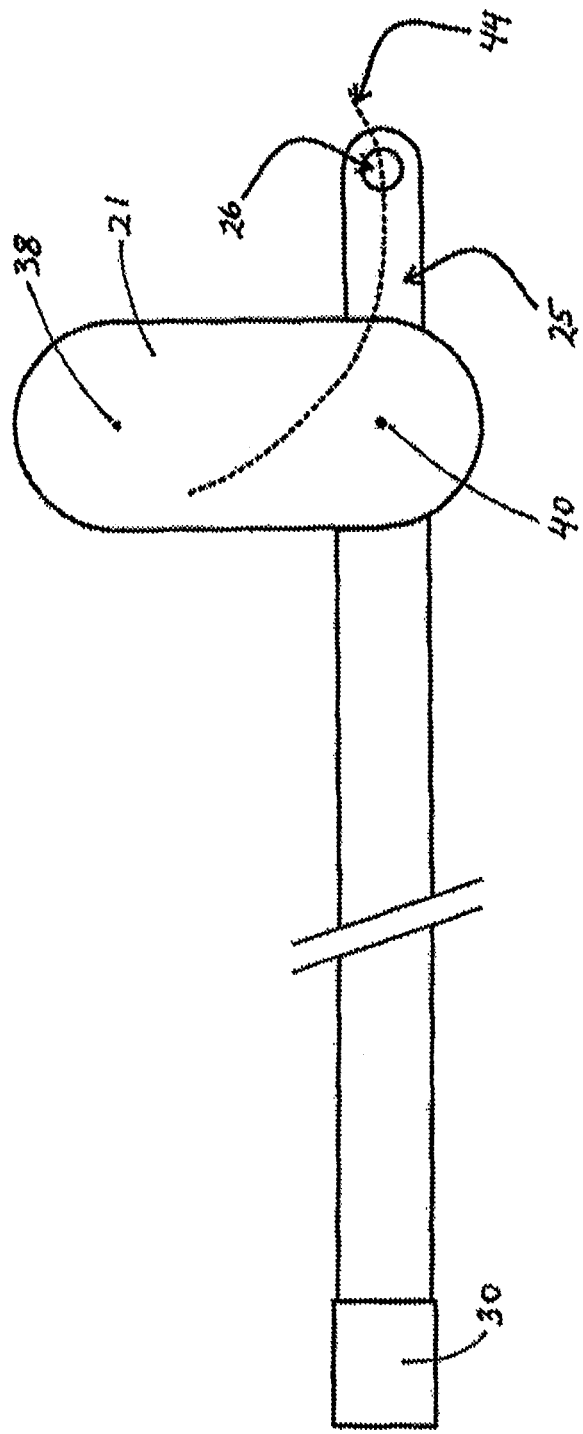
FIG. 6 is a schematic diagram, top view, of a portion of the tonearm mechanism showing the path followed by the magnet during playback of a phonographic disk.

In further detail, again referring to FIGS. 1 through 5, the combined effect of the various components is to produce a desired motion of playback stylus 31, during playback of recorded material embodied in a groove 32, impressed, in a spiral fashion, on phonograph disk 33. Tangential tracking is achieved by providing two paths for the force applied to playback stylus 31 to reach the vertically-oriented bearings. One such path is strictly mechanical and can be regarded as setting the angular position of tonearm shaft 23; another path incorporates a linkage that, in effect, sets the angular position of base shall 20, which, in the process of rotating, shifts the position of tonearm pivot housing 24. The shape of magnet guide 19 provides a means for continuously controlling the degree of such shifting as the position of playback stylus 31 changes during playback. The simplified drawing of FIG. 6 illustrates magnet path 44, shown as a dashed line, as followed during playback of a phonograph disk.

The two paths, generally described above, by which lateral (i.e. in the plane of the top surface of phonograph disk 33) forces acting upon stylus 31 are transmitted throughout the bearings and linkage, shall now be described in greater detail.

A first path for the force applied to playback stylus 31 starts with tonearm mounting collar 14, which is attached to turntable surface 11 by base screw 15. Tonearm mounting collar 14 contains within it vertically-oriented base bearing subassembly 16 which allows the rigid connection of tonearm bearing subassembly 12 to the turntable or its "tonearm board" via a single eccentrically oriented screw. Its second function is to allow for setting the height of the tonearm 13, or more correctly, vertical tracking angle ("VTA"). This can be achieved by a grub screw in tonearm mounting collar 14, effectively clamping bearing subassembly 16 when in regular operation, but, after loosening the grub screw, allowing for the bearing subassembly 16 to be slid up or down to account for different turntable/platter and or cartridge dimensions, one component of which is vertical bearing housing 17 into which base shaft 20, free to rotate about base vertical axis 38 is inserted. Attached to base shaft 20 is swivel platform 21, which rotates in a horizontal plane as base shaft 20 rotates. Swivel platform 21 supports and is rigidly affixed to tonearm bearing subassembly 12. Tonearm bearing subassembly 12 contains a second bearing assembly, also having a vertical axis of rotation, herein referred to as vertical bearing housing 22. Into this vertical tonearm bearing is inserted tonearm shaft 23, which extends from below the bottom of tonearm bearing subassembly 12 to above the top of tonearm bearing subassembly 12. Rigidly attached to tonearm shaft 23 at a point above tonearm bearing subassembly 12 is tonearm pivot housing 24, which can be connected by a screw or manufactured such that it is a one piece component. Tonearm pivot housing 24 has horizontally-oriented tonearm clearance hole 39 through which tonearm 13 is placed. Tonearm clearance hole 39 is larger in diameter than the diameter of tonearm 13, which enables tonearm 13 when following vertical motion or playback stylus 31, to move within a vertical tracking plane that contains a center axis of tonearm clearance hole 39. To constrain tonearm 13 to angular motion in the vertical tracking plane, tonearm pivot hole 41, perpendicular to tonearm clearance hole 39 and perpendicular to the vertical tracking plane is constructed in tonearm pivot housing 24. Tonearm pivot housing 24 intersects tonearm clearance hole 39, forming two distinctly separate sections of the tonearm pivot hole. One of the two sections shall be called left pivot hole 42 and the other section shall be called a right pivot hole 43. The axis of left pivot hole 42 and the axis of right pivot hole 43 are collinear. Into left pivot hole 42 is placed left point pivot bearings 27 and into right pivot hole 43 is placed right point pivot bearing 28. These two pivot point bearings serve in concert, once aligned with receptacle features, not shown in the figures, on tonearm 13 and fixed in place, to create a tonearm pivot axis about which tonearm 13 is free to rotate. Counterweight 29 is placed on one end of tonearm 13, the exact position of counterweight 29 along tonearm 13 being easily adjustable. On the other end of tonearm 13 is attached headshell 30 or similar supporting assembly. To headshell 30 is attached a transducer subassembly having various components, one of which is playback stylus 31. Playback stylus 31, supported by cantilever 37, is the one and only element that touches groove 32 in phonograph disk 33. The force with which playback stylus 31 presses down and into groove 32 is set by an adjustment procedure that involves placing and fixing counterweight 29 in a position along tonearm 13 such that a desired amount of force is applied. In tonearm assemblies designed to track (tangentially) a groove in a phonograph disk, the stylus, at the point where the stylus contacts a groove, is oriented to track the groove such that the stylus orientation equals that of the cutting stylus, i.e. runs parallel to, the vertical tracking plane is in, or at least runs parallel to, the vertical tracking plane.

A second path for the force applied to playback stylus 31 starts with the tonearm mounting collar 14. A separate component, not described previously, is part of vertically-oriented base bearing subassembly 16. This part shall be called guide platform 18; it is attached to the outside of vertical bearing housing 17. The angular orientation of guide platform 18, about the axis of base shaft 20, is adjustable. Once adjusted and fixed in place, guide platform 18 is not permitted to move, unlike base shaft 20. To the bottom of guide platform 18 is attached a magnetically active magnet guide 19. Magnet guide 19 is contoured in such a way that tangential tracking is achieved. Finally, to the bottom of tonearm shaft 23 is attached magnet platform 25, which can be attached by a screwed connection, press fit, glued or riveted means. Magnet platform 25 moves in concert with any angular motion, in a horizontal plane, of tonearm 13. To the far end of magnet platform 25 is attached magnet 26, which is press fit or interference fit and can be glued or secured by a screw, or preferably a small horizontal grub screw. The top of magnet 26 is disposed just below magnet guide 19. Magnet guide 19 never touches magnet 26, but magnet 26 is magnetically linked to magnet guide 19. While this magnetic linkage between two components permits the transmittal of a mechanical force, there is no mechanical friction associated with the magnetic linkage at the linkage point between magnet 26 and magnet guide 19.

To describe the various transfers of force with tonearm mechanism 10, consider the very slow drift of playback stylus 31 as it plays back the recorded material on phonograph disk 33. The inward motion of playback stylus 31 toward the center of phonograph disk 33 during playback occurs because the outside wall of the groove imparts a small radially directed inward force upon playback stylus 31. This force is effectively reduced to zero or even directed towards the center of the record due to the remaining, albeit small skating force. It takes nearly no force to move the arm either inward or outward other than what is required to overcome lateral arm bearing friction. Tonearm 13 responds to such a force by rotating (typically clockwise when viewed from above the turntable). In turn tonearm shaft 23 must rotate. This angular motion is transmitted to magnet 26, which in turn moves slightly relative to magnet guide 19. In particular, magnet 26 becomes misaligned with respect to magnet guide 19 and creates a magnetically induced force in the horizontal plane between guide platform 18 and magnet platform 25. Since guide platform 18 is itself fixed to vertical bearing housing 17 and pivot base 14, both stationary components, the only component left to rotate in response to the magnetically induced force is base shaft 20. The direction of rotation of base shaft 20 must be such that the magnetically-induced horizontal force diminishes and this is only achieved when tonearm 13 moves, now both in rotation and translation, such that any tangential tracking error is reduced.

In practice, due to the actual spiral groove, due to center hole (of phonograph disk 33) placement and size errors, and due to other manufacturing imperfections, the dynamic forces that are angularly applied to tonearm 13 by the walls of groove 32 during playback shift in direction and magnitude very frequently. Tonearm mechanism 10 must respond continuously and rapidly to correct any tangential tracking errors created by such dynamic forces.

In again further detail, also referring to FIGS. 1 through 6, regarding the sizes of the various parts, tonearm mechanism 10, including counterweight 29, is contained within a four inch diameter circle, approximately. While an overall smaller size could be contemplated, the compact organization of the component parts is sufficiently small for product design purposes. Reducing the size of parts comprising tonearm mechanism 10 would reduce mass that moves during operation of the invention, would permit a smaller footprint on turntable surface 11, would reduce the moments of inertia about the axes of the bearings and would potentially reduce the accuracy of tangential tracking. On the other hand, bearing susceptibility to damage and bearing rotational friction might rise. Generally, the size of components like guide platform 18, magnet guide 19, and swivel platform 21 can range from a ⅛" to ½" in thickness, and most preferably, approximately ¼" in thickness wherein the actual size is selected to exceed a desired level of mechanical stiffness, while being selected to reduce the unnecessary mass. The size of tonearm pivot housing 24 is determined by the requirements imposed by the size of point pivot bearings 27 and 28, the diameter of tonearm shaft 23, and the desired vertical swing of tonearm mechanism 10; the diameter of tonearm pivot housing 24, viewed from the top, can range from 0.5 to 1 inch, and preferably about 0.9 inches, or most preferably is 23 mm, and the height of tonearm pivot housing 24, viewed from the side, can range from 0.5 to 1 inch and preferably, is about 0.8 inches.

In further detail, also referring to FIGS. 1 through 6, regarding the materials from which the various parts are fabricated, most parts are constructed from aluminum. Parts such as magnet platform 25 and guide platform 18 must be constructed from materials that have no, or have properly controlled, influence upon the main function of the magnetic linkage that is composed of magnet guide 19 and magnet 26. Magnet 26, in a preferred embodiment, is constructed of rare earth elements. Magnet guide 19 is made of a magnetic material which can be any ferromagnetic material, like pure iron, nickel and it's alloys, i.e. Permalloy, Cobalt and its alloys or even made from another magnetic material, i.e. rare earth, bariumferrite, AlNiCo. The magnet 26 and/or magnet guide 19 can, among others, be substituted with an electromagnet, likewise is it possible to use, e.g., a permanent or electromagnet that is arc shaped to replace the magnet guide 19. The quality of the bearings having vertically-oriented axes, i.e. base bearing 34 and swivel bearing 35, largely controls the performance of tonearm mechanism 10. These bearings should have low rolling friction. Ball bearing type bearings are used, and bearing balls constructed of ceramic compounds are particularly preferred.

The tonearm mechanism 10 could alternatively be governed by a servo system. Here the magnet guide 19 may be traced optically, inductively or capacitively. Any deviation from a maximally close proximity (or maximal proximity, i.e., a maximal distance that allows the sensor to trace the magnet guide 19 of sensor and magnet guide 19 would generally call for rotating the swivel platform 21 so that minimum proximity is maintained. This can be achieved by, e.g., driving the swivel platform 21 via a motor (e.g., Brushed DC, Stepper, piezo, geared or not) attached to and driving the base shaft 20. The magnet 26 is merely the equivalent of a position sensor against magnet guide 19. Once the proximity is minimal or, alternatively, if one senses/monitors the angular orientation of tonearm bearing subassembly 12, the proper (tangential) orientation of tonearm 13 and the connected phono cartridge can be restored by rotating tonearm bearing subassembly 12 either clockwise or counterclockwise (in case of a strongly eccentric record). The swivel platform 21 would in such an embodiment become the holder/mount of the sensor.

While the preferred embodiment has been described in rich detail, various alternatives to the basic design as presented to this point are also considered within the scope of the invention.

Referring to FIGS. 2 through 5 regarding the linkage, the mechanical placement of magnet platform 25 and magnet 26 can be switched with guide platform 18 and magnet guide 19.

Referring to FIGS. 2 through 5, regarding magnet 26 and magnet guide 19, contoured surfaces of these parts, near the gap between these parts, different from those shown in the figures, are anticipated.

Referring to FIGS. 2 through 5, regarding the angular orientation of magnet platform 25 to tonearm 13, alternate angular separations of those parts may be selected from that shown in the figures.

Referring to FIG. 3, regarding base bearing 34, ball bearing components such as those used for upper swivel bearing 35 and lower swivel bearing 36 may be used to replace the simple bearings shown for base bearing 34.

Referring to FIG. 2 and FIG. 3, regarding the construction of tonearm housing 24 and in particular the point pivot bearings 27 and 28, the desired degree of freedom provided by such bearings (in this case, pivoting about a horizontal axis and over a small range) may be achieved by alternate means such as ball bearings, roll or cylindrically shaped bearings, or by other physical structures known in the art that accomplish the same goal.

The invention claimed is:

1. A tonearm system for the replay of LP's comprising a tonearm bearing assembly mounted on a record player wherein said tonearm bearing assembly comprises:
   (a) a tonearm mounting collar attached to a record player;
   (b) a base bearing subassembly which is vertically oriented and comprises a top and bottom end and attached to said tonearm mounting collar;
   (c) a swivel platform attached to said base bearing subassembly, wherein said swivel platform comprises a hole to receive a tonearm bearing housing which is vertically-oriented wherein said top end of said tonearm bearing housing comprises a plurality of upper swivel bearings and said bottom end of said base tonearm bearing housing comprises a plurality of bottom swivel bearings;
   (d) a tonearm shaft having a top end and a bottom end which is received by said upper and bottom plurality of swivel bearings;
   (e) a tonearm pivot housing having a top surface and bottom surface wherein said bottom surface is attached to said top end of said tonearm shaft and said tonearm pivot housing comprises a horizontally-oriented tonearm clearance hole containing a plurality of pivot bearings through which a tonearm is received;
   (f) a magnet platform which is attached at one end of said magnet platform to said bottom end of said tonearm shaft and a second end of said magnet platform comprising a magnet; wherein said base bearing assembly comprises a magnet guide platform wherein said magnet guide platform comprises a magnet guide which is attached to said magnet guide platform wherein said magnet guide is located above said magnet of said magnet platform such that a magnetic linkage is created between said magnet and said magnet guide to move said tonearm in rotation and translation, such that any tangential tracking error is reduced.

2. The tonearm system according to claim 1 wherein said horizontally oriented tonearm clearance hole of said tonearm pivot housing is larger in diameter than the diameter of said tonearm such that said tonearm is able to move within a vertical tracking plane around the center axis of said horizontally oriented tonearm clearance hole.

3. The tonearm system according to claim 2, wherein said tonearm pivot housing comprises a tonearm pivot hole wherein said tonearm pivot hole is perpendicular to said horizontally oriented tonearm clearance hole and perpendicular to the vertical tracking plane.

4. The tonearm system according to claim 3, wherein said tonearm pivot hole comprises a left pivot hole and a right pivot hole wherein the axis of said left pivot hole and right pivot hole is collinear.

5. The tonearm system according to claim 4, wherein a plurality of bearings are received within said left pivot hole and said right pivot hole to create a pivot axis wherein said tonearm is able to rotate.

6. The tonearm system according to claim 1, wherein said tonearm comprises a headshell wherein said headshell comprises a cantilever wherein a stylus is attached to said cantilever.

7. The tonearm system according to claim 1, wherein the angular orientation of said magnet guide platform is adjustable in relation to the axis of said tonearm shaft.

8. The tonearm system according to claim 1, wherein said magnet is manufactured from rare earth elements.

9. The tonearm system according to claim 1, wherein said magnet guide comprises a ferromagnetic material.

10. The tonearm system according to claim 9, wherein said ferromagnetic materials are selected from the group consisting of iron, nickel, and its alloys or a combination thereof, and rare earth, barium ferrite.

11. The tonearm system according to claim 1, wherein said base bearing subassembly comprises a base shaft having a top end and bottom end and said swivel platform comprises a top surface and a bottom surface and said top end of said base shaft is attached to the bottom surface of said swivel platform.

12. The tonearm system according to claim 1 wherein said plurality of upper and lower swivel bearings are ball bearings.

13. The tonearm system according to claim 12, wherein said ball bearings are made of ceramic compounds.

14. The tonearm system according to claim 1, wherein said plurality of pivot bearings can be selected from the group consisting of ball bearings, roll and cylindrically shaped bearings.

\* \* \* \* \*